United States Patent Office 2,714,098

Patented July 26, 1955

2,714,098

PHENOLIC RESINOUS COMPOSITIONS

Robert W. Martin, Lafayette, Calif., assignor to General Electric Company, a corporation of New York No Drawing. Application May 15, 1952, Serial No. 288,026

17 Claims. (Cl. 260—38)

This invention relates to the manufacture of improved phenol-aldehyde resins employed in molding applications. More particularly, the invention is concerned with improved molding compositions comprising a fusible, soluble phenol-aldehyde novolac resin, hexamethylenetetramine, and a monomeric epoxide composition selected from the class consisting of epichlorohydrin, glycidyl allyl ether, diglycidyl ether, styrene oxide, and butadiene monoxide.

In preparing molding compositions derived from phenol-aldehyde condensation products, it is generally customary to make two-stage resins by reacting, for instance, less than a mol of an aldehyde, e. g., formaldehyde, with a mol of phenol. After dehydration, the resin is in a fusible, soluble, brittle state commonly referred to as a "novolac" resin. These resins are permanently fusible and soluble, and in order to convert them to the infusible and insoluble state, it requires incorporation of a curing agent in the resin. For this purpose hexamethylenetetramine is the agent commonly used for attaining the infusible and insoluble state. However, when this latter material is used, objectionable amounts of free ammonia are liberated during the heat-curing of the resin so as to cause blistering or porosity in the finished molded piece. In order to minimize these defects, it has been found necessary to keep the molded product in the mold for longer periods of time than is desirable, or, alternatively, to partially degas the mold in which the resinous composition is being molded by lifting one of the mold sections from the article being molded for a short period of time to release the trapped gases. This means more manipulative acts and undesirably longer cycles in the mold, thus resulting in increased cost of molding the object.

Several methods have been proposed in the past for obviating these difficulties. One method suggested involves the addition with the hexamethylenetetramine of organic or inorganic acids to the resin after the initial condensation has taken place. Generally, such acids, as, for instance, hydrochloric acid, sulfuric acid and sulfamic acid, have avoided to a certain extent the various difficulties recited above, but this has been accompanied by other disadvantages. Thus, inorganic acids, although they permit faster curing of the resin, lead to extensive corrosion of the mold and sticking of the molded part to the mold. The use of organic acids in place of inorganic acids permits the curing action to proceed more smoothly than when inorganic acids are employed, but sticking of the molded part to the mold is still present as a problem.

It has now been found that two-step phenolaldehyde resins which employ hexamethylenetetramine to complete the cure can be heated and cured more rapidly at elevated temperatures with improved results such as more rapid gellation and better processability, by employing in combination with the hexamethylenetetramine, a monomeric epoxide selected from the class consisting of epichlorohydrin, glycidyl allyl ether, styrene oxide, diglycidyl ether, and butadiene monoxide. The addition of the monomeric epoxide so reduces the tendency to blister that the necessity of using the degassing procedure is no longer required in order to obtain denser, stronger, and blister-free cured pieces.

An improvement resulting from employment of the monomeric epoxide in the aforementioned two-stage phenolaldehyde resins, for brevity hereinafter referred to as "novolac resin," is the promotion of a faster initial gelling especially characteristic upon the application of heat to the resin, thereby imparting quicker rigidity to the molded structural shapes and permitting faster molding cycles. In addition, it has also been found that better processability of the resin preparing it for use in the mold is one of the unexpected advantages obtained by using the monomeric epoxides in combination with hexamethylenetetramine.

The fact that the aforementioned monomeric epoxides were eminently suitable in such relatively small amounts for effecting the desirable results described above in connection with the curing of novolac resins was entirely unexpected and in no way could have been predicted since the use of polymeric epoxy compositions was impractical and not equivalent because it required much larger amounts of these polymeric epoxy compositions to effect satisfactory curing of the novolac resins than were required using the monomeric epoxides. A further distinction is the fact that the polymeric epoxy resins in which the proportionate epoxide content is very low, in addition to being self-curing, which the monomeric epoxides are not, also act as curing agents for novolac resins without the necessity of adding hexamethylenetetramine. In contrast to this, the monomeric epoxides are not curing agents for the novolac resins yet they exert a strong effect on improving the rate of cure when used with the hexamethylenetetramine.

The novolac resins employed in the practice of the present invention are generally obtained by reacting phenol and an aldehyde, for example, formaldehyde, in a molar ratio such that the phenol is present in a molar excess over the formaldehyde. Generally, acid catalysts are employed for the condensation reaction, but certain alkaline catalysts may also be used. Thus, such novolac resins may be prepared, for instance, from 1.17 to 2. or more mols of phenol per mol of formaldehyde, using as a catalyst, for example, hydrochloric acid, sulfuric acid, etc. The mixture of ingredients including the catalyst for condensation of the phenol and formaldehyde is generally heated at elevated temperatures of the order of about 80 to 100° C., preferably at the reflux temperature of the mass for times varying from about 1 to 4 hours. At the end of the reflux period, the resin is dehydrated until about 85 per cent of the water is removed. Thereafter it is advantageous to neutralize the acid present in the reaction mixture by the incorporation of an alkaline material, for example, hydrated lime. It has been found desirable to continue dehydration of the novolac resin until the desired flow point is reached, e. g., when flow occurs at around 80 to 100° C. using the ring and ball test according to ASTM E—28—42T. The resin is then released from the reaction vessel at an elevated temperature at which it will flow, for example, about 100 to 120° C., into an open vessel where it is permitted to cool and thereafter broken up for future processing into a molding composition. This novolac resin is permanently fusible and soluble (e. g., in acetone), and when mixed with the necessary amounts of hexamethylenetetramine, can be converted to the substantially infusible and insoluble state.

In the preparation of the novolac resins, it is desirable that essentially all the phenolic body be phenol or similar trifunctional bodies. However, other phenolic bodies, namely, substituted phenols, as, for instance, meta-cresol, para-cresol, Bisphenol A, 3,5-xylenols, coal tars acids, etc., may be incorporated provided at least 50 per cent of the mixture of phenolic bodies comprises a tri-functional phenol such as phenol itself in order to introduce the functionality necessary in the final novolac resin.

As will be apparent to those skilled in the art, the amount of hexamethylenetetramine incorporated in the novolac resin may be varied depending on several factors, including the type of novolac resin employed. Thus, the original ratio of formaldehyde to phenol in the novolac resin will in many respects determine the amount of hexamethylenetetramine required to convert the fusible, soluble novolac to the substantially infusible and insoluble state under molding conditions. Generally, I have found that based on the weight of the novolac resin, I may use from about 6 to 20 per cent, preferably from 9 to 15 per cent, of the hexamethylenetetramine. The hexamethylenetetramine can be incorporated at any time after formation of the novolac resin. The hexamethylenetetramine is advantageously incorporated in the novolac resin at the same time that the monomeric epoxide is incorporated prior to addition of further modifying ingredients such as fillers, release agents, pigments, dyes, etc. The mixture of ingredients, including the novolac resin, hexamethylenetetramine, and monomeric epoxide is quite stable and can be stored for reasonable periods of time without impairment of the molding composition or molded products therefrom.

The amount of monomeric epoxide employed in combination with the hexamethylenetetramine may be varied within certain limits. Generally, I may employ up to about 20 per cent, by weight, monomeric epoxide based on the weight of the novolac resin. The amount of monomeric epoxide employed will vary depending on the type of novolac resin used, the monomeric epoxide employed, etc. A particularly advantageous range is one from about 5 to 20 per cent, by weight, of the monomeric epoxide, based on the weight of the fusible, soluble novolac resin.

In preparing molding compounds from the novolac resin, hexamethylenetetramine and the monomeric epoxide, this mixture of ingredients, together with other modifying agents, such as fillers, pigments, release agents, dyes, etc., are mixed together and sheeted on differential rolls until intimate dispersion of the various ingredients throughout the mass is effected. This rolling time is an important factor in determining the cost of the molding compound since molding compositions requiring undesirably long times of rolling to obtain a product of adequate processability in the mold may be economically impractical. It has been found that the incorporation of the monomeric epoxides cuts down the rolling time on the differential rolls necessary to obtain a product suitable for molding purposes, and that this decrease in rolling time is materially less than the time required to roll mixtures of ingredients from which the monomeric epoxide is omitted to give equivalent molded products.

After rolling on the above-described differential rolls, the sheets which are generally in the form of brittle masses are ground to a fine particle size to be used in molding applications. Conditions under which the molding is carried out may, of course, vary depending on the type of resin employed, the amount of hexamethylenetetramine, the amount of monomeric epoxide, the size of the object molded, etc. Generally, I have found that temperatures of the order of about 150 to 175° C. for times varying from about 1 to 5 minutes or more at pressures of about 1500 to 4000 p. s. i. are useful in the molding cycle. All these conditions of the molding cycle are subject to variations depending on the factors recited above.

In order that those skilled in the art may better understand how the present invention may be practiced, the following examples are given by way of illustration and not by way of limitation. All parts are by weight.

EXAMPLE 1

A fusible, soluble novolac resin was prepared by adding to a reaction kettle fitted with a stirrer, reflux condenser and heating means, a mixture of ingredients comprising 56 parts synthetic phenol, about 42.5 parts aqueous formaldehyde (37.2 per cent formaldehyde), and 0.29 part of 1.83 specific gravity sulfuric acid dissolved in about 3.57 parts water. The reaction mixture was then heated to a reflux temperature of about 80° C. while applying a vacuum of about 15 to 16 inches. Refluxing of the mass was continued for about 2 hours. At the end of this time, it was found that the residual formaldehyde was less than 6 per cent. The reflux system was then changed to a dehydration system and the resin was dehydrated under vacuum until about 85 per cent of the theoretical amount of water condensate was removed. In order to neutralize the sulfuric acid, about 0.34 part hydrated lime dispersed in 1.8 parts water was added to the mixture and the latter stirred while at the same time continuing the dehydration until substantially all the water which was present in the novolac resin was removed. The resin was then discharged from the reaction kettle at a temperature of about 100 to 115° C. into an open pan. After permitting the resin to cool, it was removed and ground to a fine particle size suitable for molding.

EXAMPLE 2

This example illustrates the effect of adding hexamethylenetetramine as a curing agent to the above prepared novolac resin and the effect of adding hexamethylenetetramine together with monomeric epoxides to the aforesaid novolac resin. In each case, with the exception of the control in which hexamethylenetetramine alone was used, hexamethylenetetramine and the monomeric epoxide were added to the powdered novolac resin and mixed thoroughly until a homogeneous mixture was obtained. Thereafter, each sample was tested for the stroke cure on a flat iron surface held at a temperature of about 170° C. This stroke cure comprised the time in seconds required to gel or cure a 1 gram sample when stroked on a hot plate at a controlled temperature, that is, at 170° C. The following Table I shows the stroke cure in seconds for the various samples in which the stroke cures were carried out under the conditions recited above. When making the mixtures with the novolac resin, there was used in the control 85 parts of the novolac resin and 15 parts of hexamethylenetetramine, or a sufficient quantity of a mixture of hexamethylenetetramine plus the monomeric epoxide to give 15 parts of hexamethylenetetramine. The mixture of the hexamethylenetetramine and the monomeric epoxide contained one mol of epoxide per mol of hexamethylenetetramine.

*Table I*

| Parts Hexamethylenetetramine | Monomeric Epoxide | Parts Monomeric Epoxide | Stroke Cure In Seconds |
|---|---|---|---|
| 15 | None | 0 | 30 |
| 15 | Epichlorohydrin | 9.9 | 8 |
| 15 | Glycidyl Allyl Ether | 12.2 | 5 |
| 15 | Styrene Oxide | 12.8 | 5 |
| 15 | Butadiene Monoxide | 7.5 | 6 |
| 15* | None | 0 | 106 |
| 15* | Styrene Monoxide | 4.3 | 23 |

*Stroke cure carried out at 149° C.

From the aforementioned Table I, it will be noted that the incorporation of the monomeric epoxides reduced the rate of curing of the novolac resin containing hexamethylenetetramine remarkably. Thus, the rate of cure in the case of using the monomeric epoxide was approximately from 1/6 to 1/4 of the time required for curing the same resin from which the monomeric epoxide was omitted.

EXAMPLE 3

To show the effect of using a monomeric epoxide in a molding composition, 100 parts of the novolac resin described in Example 1 were mixed with 14 parts hexamethylenetetramine, 1.5 parts dehydrated lime, 0.25 part calcium stearate, and 2.0 parts of talc. About 45 parts of this mixture were then mixed with about 47 parts of a cellulosic filler, namely, wood flour, and small amounts of pigments and dyes together with about 1 part of a lubricant or mold release agent. This mixture was then rolled on differential rolls until a sheet was formed which when ground and molded gave a blister-free molded part. Another mixture was then prepared in which there was incorporated, in addition to the hexamethylenetetramine described above, 4.4 parts styrene monoxide. This mixture was also compounded on differential rolls similarly as was done with the mixture free of the styrene monoxide. It was found that comparable properties in the rolled sheets were obtained after 75 seconds using the styrene monoxide as compared to 120 seconds required for rolling on the differential rolls the mixture without the styrene oxide. This constitutes a material reduction in the processing time, thus requiring less manual manipulation and less use of equipment, with a material saving in time and money. Each of the molding compositions described above was molded in a disk mold using a time cycle in which a minimum amount of time was necessary to give a blister-free product. In the case of the molding composition containing no styrene monoxide, it was found necessary to use a cure time in the mold of about 100 to 105 seconds at about 165° C. and 4000 p. s. i. to obtain a molded product which did not exhibit evidence of blistering. In contrast to this, a comparable molded product was obtained using the styrene monoxide after only 85 seconds of molding under similar conditions. This shows about a 15 per cent reduction in cure time for the same molding compositions. In addition, it was found that the molding compound containing styrene monoxide had good flow in the mold and showed no tendency to corrode or stick to the mold.

It will, of course, be apparent to those skilled in the art that other molding compositions containing various novolac resins may be employed without departing from the scope of the invention. Obviously other aldehydes, for example, acetaldehyde, propionaldehyde, butyraldehyde, furfural, etc. may be used in place of or in combination with the formaldehyde in making the molding resins, specifically the novolac used in making the molding composition. Also, the amount of hexamethylenetetramine and the monomeric epoxide may also be varied without departing from the scope of the invention. However, the particular choice of monomeric epoxide will depend on the cost, volatility, and efficiency. In addition to the monomeric epoxide described in Example 2 above, other monomeric epoxides, many examples of which have been given above, may also be employed in molding compositions without departing from the scope of the invention.

Obviously, other fillers, such as asbestos floats or fibers, glass fibers or chopped glass, cloth, talc, lithopone, etc., together with various other modifying ingredients such as dyes, pigments, mold release agents, opacifiers, etc., may also be employed in combination with the compositions herein defined. The fillers may be varied widely in amount and may comprise, by weight, for instance, from about 0.2 to 2 parts of filler per part novolac resin, depending on the desired properties of the molding compositions. Larger or smaller amounts of filler may be employed and varying amounts of the other additives may be used without departing from the scope of the invention.

My invention may be employed to make molded objects, for example, molded radio cabinets, more rapidly thus realizing material savings in money. Obviously, a greater savings in time may be realized by employing higher molding temperatures or larger amounts of monomeric epoxide. The resinous compositions herein described may also be used to mold various parts wherein good flow and rapid curing are desirable, as, for example, parts for electrical equipment at home and in the automotive industry, housings for various types of equipment including electrical equipment, etc.

What I claim as new and desire to secure by Letters Patent of the United States is:

1. A composition of matter consisting of a phenol-aldehyde novolac resin, 6 to 20 percent, by weight of the resin, of hexamethylenetetramine, from about 5 to 20 percent, by weight of the resin, of a monomeric epoxide selected from the class consisting of epichlorohydrin, glycidyl allyl ether, styrene monoxide, and butadiene monoxide and by weight, from about 0.2 to 2 parts of a filler per part of said initial resin.

2. A composition of matter consisting of a phenol-aldehyde novolac resin, 6 to 20 percent, by weight of the resin, of hexamethylenetetramine, from about 5 to 20 percent by weight of the resin of epichlorohydrin and by weight, from about 0.2 to 2 parts of a filler per part of said initial resin.

3. A composition of matter consisting of a phenol-aldehyde novolac resin, from 6 to 20 percent hexamethylenetetramine, 5 to 20 percent, by weight of the resin, of glycidyl allyl ether and by weight, from about 0.2 to 2 parts of a filler per part of said initial resin.

4. A composition of matter consisting of a phenol-aldehyde novolac resin, from 6 to 20 percent hexamethylenetetramine, from 5 to 20 percent styrene monoxide, the weights of the hexamethylenetetramine and the styrene monoxide being based on the aforesaid novolac resin.

5. A composition of matter consisting of a phenol-aldehyde novolac resin, from 6 to 20 percent hexamethylenetetramine, from 5 to 20 percent butadiene monoxide and by weight, from about 0.2 to 2 parts of a filler per part of said initial resin, the weights of the hexamethylenetetramine and the butadiene monoxide being based on the aforesaid novolac resin.

6. A composition of matter consisting of a phenol-formaldehyde novolac resin, a filler, from 6 to 20 percent hexamethylenetetramine, and from 5 to 20 percent styrene monoxide, the weights of the hexamethylenetetramine and the styrene monoxide being based on the aforesaid novolac resin.

7. The heat-treated product of claim 1.

8. The heat-treated product of claim 2.

9. The heat-treated product of claim 3.

10. The heat-treated product of claim 4.

11. The heat-treated product of claim 5.

12. The heat-treated product of claim 6.

13. The method of accelerating the cure of a phenol-aldehyde novolac resin to the substantially infusible and insoluble state which comprises incorporating in the aforesaid resin, from 6 to 20 percent hexamethylenetetramine and from 5 to 20 percent of a monomeric epoxide selected from the class consisting of epichlorohydrin, glycidyl allyl ether, styrene monoxide and butadiene monoxide, and thereafter molding the mixture under heat and pressure, the weights of the hexamethylenetetramine and epoxide resin being based on the aforesaid novolac resin.

14. The method of accelerating the cure to the substantially infusible and insoluble state of a molding composition comprising a phenol-formaldehyde novolac resin containing a filler, which process comprises incorporating from 6 to 20 percent hexamethylenetetramine and from 5 to 20 percent epichlorohydrin in the aforesaid molding composition, and thereafter molding the mixture under heat and pressure, the weights of the hexamethylenetetramine and epichlorohydrin being based on the aforesaid novolac resin.

15. The method of accelerating the cure to the substantially infusible and insoluble state of a molding composition comprising a phenol-formaldehyde novolac resin containing a filler, which process comprises incorporating from 6 to 20 percent hexamethylenetetramine and from 5 to 20 percent glycidyl allyl ether in the aforesaid molding composition, and thereafter molding the mixture under heat and pressure, the weights of the hexamethylenetetramine and glycidyl allyl ether being based on the aforesaid novolac resin.

16. The method of accelerating the cure to the substantially infusible and insoluble state of a molding composition comprising a phenol-formaldehyde novolac resin containing a filler, which process comprises incorporating from 6 to 20 percent hexamethylenetetramine and from 5 to 20 percent styrene monoxide in the aforesaid molding composition, and thereafter molding the mixture under heat and pressure, the weights of the hexamethylenetetramine and styrene monoxide being based on the aforesaid novolac resin.

17. The method of accelerating the cure to the substantially infusible and insoluble state of a molding composition comprising a phenol-formaldehyde novolac resin containing a filler, which process comprises incorporating 6 to 20 percent hexamethylenetetramine and 5 to 20 percent butadiene monoxide in the aforesaid molding composition, and thereafter molding the mixture under heat and pressure, the weights of the hexamethylenetetramine and butadiene monoxide being based on the aforesaid novolac resin.

References Cited in the file of this patent

UNITED STATES PATENTS

| | | |
|---|---|---|
| 2,060,410 | Balle | Nov. 10, 1936 |
| 2,258,546 | Dietz | Oct. 7, 1941 |
| 2,422,637 | Thomas | June 17, 1947 |

FOREIGN PATENTS

| | | |
|---|---|---|
| 51,933 | Holland | Feb. 16, 1942 |
| 251,647 | Switzerland | Sept. 1, 1948 |

OTHER REFERENCES

Carswell, Phenolplasts, page 31, Interscience Publishers Inc., New York (1947).

Robitschek Phenolic Resins, pages 73–76, Iliffe and Sons, Ltd. London, England (1950).